(12) United States Patent
Terayama

(10) Patent No.: US 10,737,660 B2
(45) Date of Patent: Aug. 11, 2020

(54) SYSTEM AND COMPUTER READABLE STORAGE MEDIUM

(71) Applicant: HONDA MOTOR CO., LTD., Tokyo (JP)

(72) Inventor: Yoshito Terayama, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/434,186

(22) Filed: Jun. 7, 2019

(65) Prior Publication Data

US 2019/0375371 A1 Dec. 12, 2019

(30) Foreign Application Priority Data

Jun. 8, 2018 (JP) ................................. 2018-110649

(51) Int. Cl.
*B60R 25/24* (2013.01)
*B60R 25/04* (2013.01)
*B60K 28/00* (2006.01)

(52) U.S. Cl.
CPC .............. *B60R 25/24* (2013.01); *B60R 25/04* (2013.01); *B60K 2028/003* (2013.01)

(58) Field of Classification Search
CPC ... B60R 25/24; B60R 25/04; B60K 2028/003; B60K 28/00; B60K 28/06; B60W 2540/24; B60W 2540/043; G08B 21/22; G08B 21/02; G08B 21/0269; G08B 21/0461

USPC ..................................................... 340/426.11
See application file for complete search history.

(56) References Cited

U.S. PATENT DOCUMENTS

| 2007/0200663 | A1* | 8/2007 | White ..................... A61B 5/145 340/5.31 |
| 2014/0297061 | A1 | 10/2014 | Takahashi |
| 2016/0318521 | A1* | 11/2016 | Nothacker ............ B60W 40/08 |

FOREIGN PATENT DOCUMENTS

JP        2006050188 A       2/2006

* cited by examiner

*Primary Examiner* — Joseph H Feild
*Assistant Examiner* — Sharmin Akhter

(57) ABSTRACT

A system includes a unit to obtain starting prohibition information including first user identification information and vehicle identification information; a prohibiting unit to, when a first user identified by the first user identification information is a user permitted to prohibit a vehicle from starting, prohibit a vehicle identified by the vehicle identification information in the starting prohibition information from starting; a unit to obtain prohibition cancel information including second user identification information and vehicle identification information; and a unit to, when a second user identified by the second user identification information is a user permitted to cancel prohibition of starting of a vehicle and a vehicle identified by the vehicle identification information in the prohibition cancel information is the vehicle prohibited by the prohibiting unit from starting, cancel the prohibition of the starting of the vehicle identified by the vehicle identification information in the prohibition cancel information.

11 Claims, 9 Drawing Sheets

| USER ID | VEHICLE ID |
|---------|------------|
| USER ID1 | VEHICLE ID1 |
| USER ID1 | VEHICLE ID12 |
| USER ID2 | VEHICLE ID2 |
| ⋮ | ⋮ |
| USER ID5 | VEHICLE ID5 |

*FIG. 3*

| USER ID | VEHICLE ID | PROHIBITION TIME | SCHEDULED CANCEL TIME | CANCEL TIME | DESIGNATED DRIVER SERVICE COMPANY ID |
|---|---|---|---|---|---|
| USER ID1 | VEHICLE ID1 | 2018/5/21 19:30 | 2018/5/22 7:30 | — | — |
| USER ID2 | VEHICLE ID2 | 2018/5/20 20:00 | 2018/5/21 8:00 | 2018/5/21 8:00 | — |
| ... | ... | ... | ... | ... | ... |
| USER IDn | VEHICLE IDn | 2018/5/19 19:30:00 | 2018/5/20 7:30:00 | 2018/5/19 21:50:00 | DESIGNATED DRIVER SERVICE COMPANY IDn |

FIG. 6

SYSTEM AND COMPUTER READABLE STORAGE MEDIUM

The contents of the following patent application are incorporated herein by reference: Japanese Patent Application NO. 2018-110649 filed on Jun. 8, 2018.

BACKGROUND

1. Technical Field

The present invention relates to a system and a computer readable storage medium.

2. Related Art

There are known techniques for preventing drunk driving (see the following patent document 1, for example). Also, there are known techniques for remotely managing vehicles (see the following patent document 2, for example).

PRIOR ART DOCUMENT

[Patent document 1] Japanese Patent Application Publication No. 2014-201121
[Patent document 2] Japanese Patent Application Publication No. 2006-50188

SUMMARY

There is a need for a mechanism which does not rely only on a will of a user in order, for example, to prevent drunk driving more effectively. Generally, such a mechanism may desirably prohibit a user from readily driving a vehicle though relying on the will of the user.

BRIEF DESCRIPTION OF THE DRAWINGS

FIG. 3 shows prohibition-permitted user information in a table.

FIG. 6 schematically shows in a table, one example of prohibition management information managed by the server 30.

DESCRIPTION OF EXEMPLARY EMBODIMENTS

Hereinafter, the present invention will be described with reference to embodiments of the invention. However, the following embodiments should not to be construed as limiting the claimed invention. Also, all the combinations of the features described in the embodiments are not necessarily essential for means provided by aspects of the invention.

Figure 1:
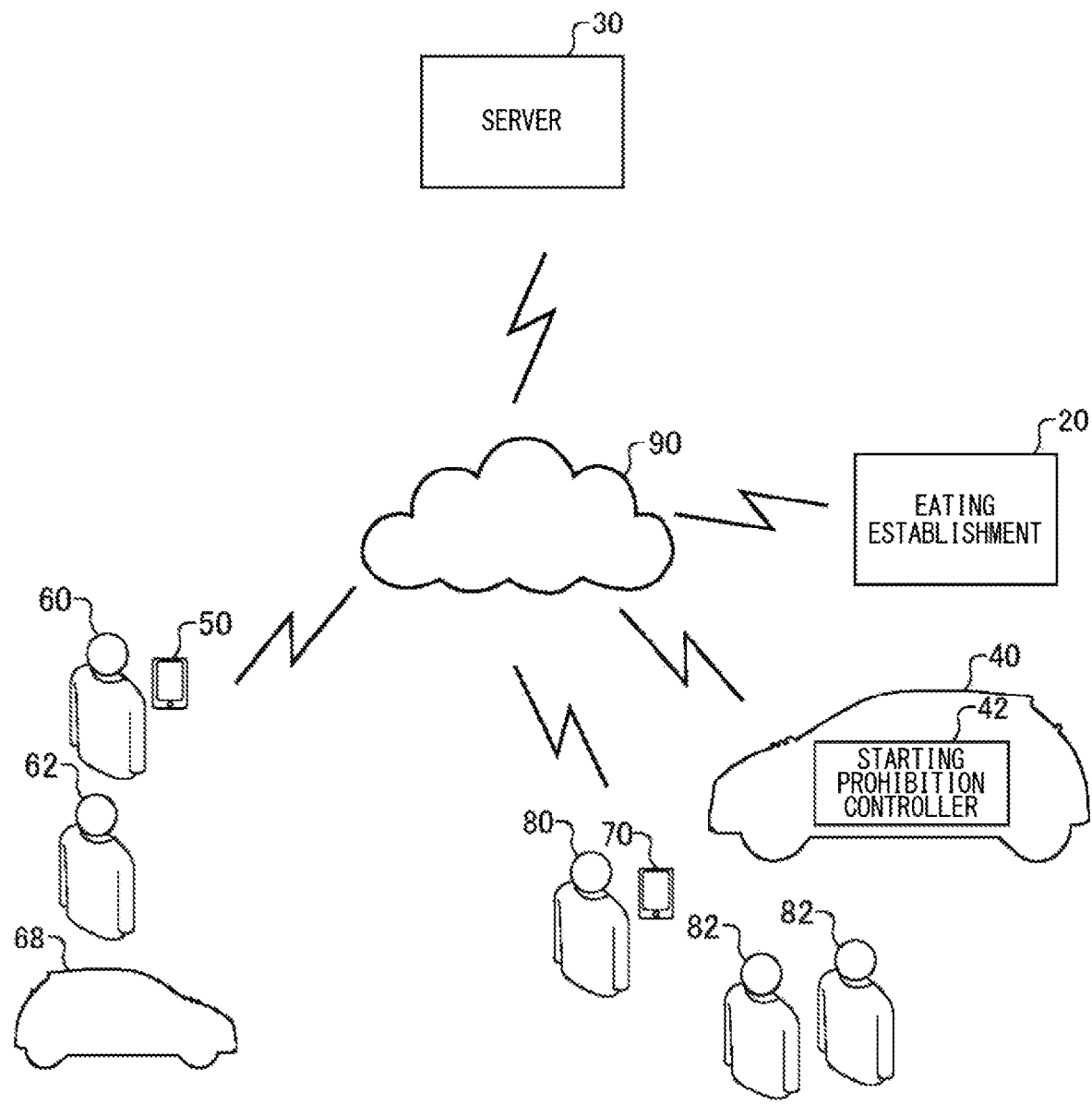
FIG. 1 schematically shows an environment in which a drunk driving prevention system 10 is used according to one embodiment.

FIG. 1 schematically shows an environment in which a drunk driving prevention system 10 is used according to one embodiment. The drunk driving prevention system 10 includes a server 30, a vehicle 40, a user terminal 70 and a terminal of the designated driver service company 50. The vehicle 40 is an automobile, for example. The vehicle 40 is one example of transport equipment.

The server 30 is connected to the vehicle 40, the user terminal 70 and the terminal of the designated driver service company 50 over a network 90. Any network will do as the network 90. For example, the network 90 may include at least any of the Internet, a mobile phone network such as so-called 3G (3rd Generation) network, LTE (Long Term Evolution) network, 4G (4th Generation) network and 5G (5th Generation) network, a public wireless LAN (Local Area Network) and a private network. The vehicle 40 may be wirelessly connected to the network 90. The user terminal 70 may be wirelessly connected to the network 90. The terminal of the designated driver service company 50 may be wirelessly connected to the network 90.

The user 80 is an owner of the vehicle 40. The companion 82 is visiting an eating establishment 20 with the user 80. The eating establishment 20 serves alcohol. For example, when going out using the vehicle 40 and before drinking alcohol served by the eating establishment 20, the user 80 uses a drunk driving prevention application software installed on the user terminal 70 to request the server 30 to disable the vehicle 40 from being driven. In response to the request from the user terminal 70, the server 30 sends a starting prohibition signal to the vehicle 40. This causes a starting prohibition controller 42 of the vehicle 40 to prohibit starting of the vehicle 40. In this way, the vehicle 40 enters a driving-prohibited state.

Then, the user 80 goes to the eating establishment with the companion 82 and shows the screen image of the drunk driving prevention application software on the user terminal 70 to staff of the eating establishment 20 to let the staff know that the vehicle 40 is in the driving-prohibited state. When the eating establishment 20 side confirms that the vehicle 40 is in the driving-prohibited state, the eating establishment 20 offers discount service to the user 80 and the companion 82.

When the user 80 leaves the eating establishment 20, the user 80 uses the drunk driving prevention application software to request designated driver service for the vehicle 40 from a designated driver service company registered with the drunk driving prevention system 10. A designated driver 60 and a designated driver 62 of the designated driver service company use an associated car 68 to go to the place where the vehicle 40 is parked. The designated driver 60 receives the key of the vehicle 40 from the user 80, and then inputs the vehicle registration number of the vehicle 40 on the drunk driving prevention application software installed on the terminal of the designated driver service company 50 to request the server 30 to cancel the prohibition of the starting of the vehicle 40. The server 30 sends, to the vehicle 40, a prohibition cancel signal that instructs cancel of the prohibition of the starting. This causes the starting prohibition controller 42 of the vehicle 40 to cancel the prohibition of the starting of the vehicle 40. In this way, the vehicle 40 enters an driving-allowed state.

With the drunk driving prevention system 10, only a third person is allowed to drive the vehicle 40 after the user 80 prohibits starting of the vehicle 40. As such, the chance of the user 80 driving while drunk can be reduced.

Further, with the drunk driving prevention system 10, the eating establishment 20 may serve alcohol to the user 80 with no worry because it is obvious that the user 80 will not drive while drunk. In addition, by offering the discount service to the user 80 for utilizing the drunk driving prevention system 10, the eating establishment 20 may show that the eating establishment contributes to society in terms of elimination of drunk driving, and even graciously entertain the user 80 who visited the eating establishment using the vehicle 40. Further, the offering triggers the conversation between the staff of the eating establishment 20 and the user 80.

The user 80 and the companion 82 are allowed to receive the entertainment from the eating establishment 20, which leads to the companion 82 feeling gratitude for the user 80. Some situations make the user 80 drive the vehicle 40 to hurry up to the eating establishment 20, enabling the user 80 to express his/her feeling to the companion 82. The user 80 may show the vehicle 40 of his/her own to the companion 82, and besides, conversation between the user 80 and the companion 82 is triggered.

In addition, from the conversation and atmosphere among the staff, the user 80, and the companion 82, staff of the eating establishment 20 and other customers can understand advantages of owning a vehicle having a starting prohibiting and cancelling function and utilizing designated driver service. This can promote utilization of designated driver service, and thus results in benefit of a designated driver service company. An operator of the drunk driving prevention system 10 can operate the drunk driving prevention system 10 through receiving fee for the drunk driving prevention system 10 from designated driver service companies without having to receive fee from the user 80 or the eating establishment 20. Also, the operator of the drunk driving prevention system 10 can contribute to society in terms of elimination of drunk driving. Further, the system will give more appeal to a vehicle having a starting prohibiting and cancelling function.

Figure 2:
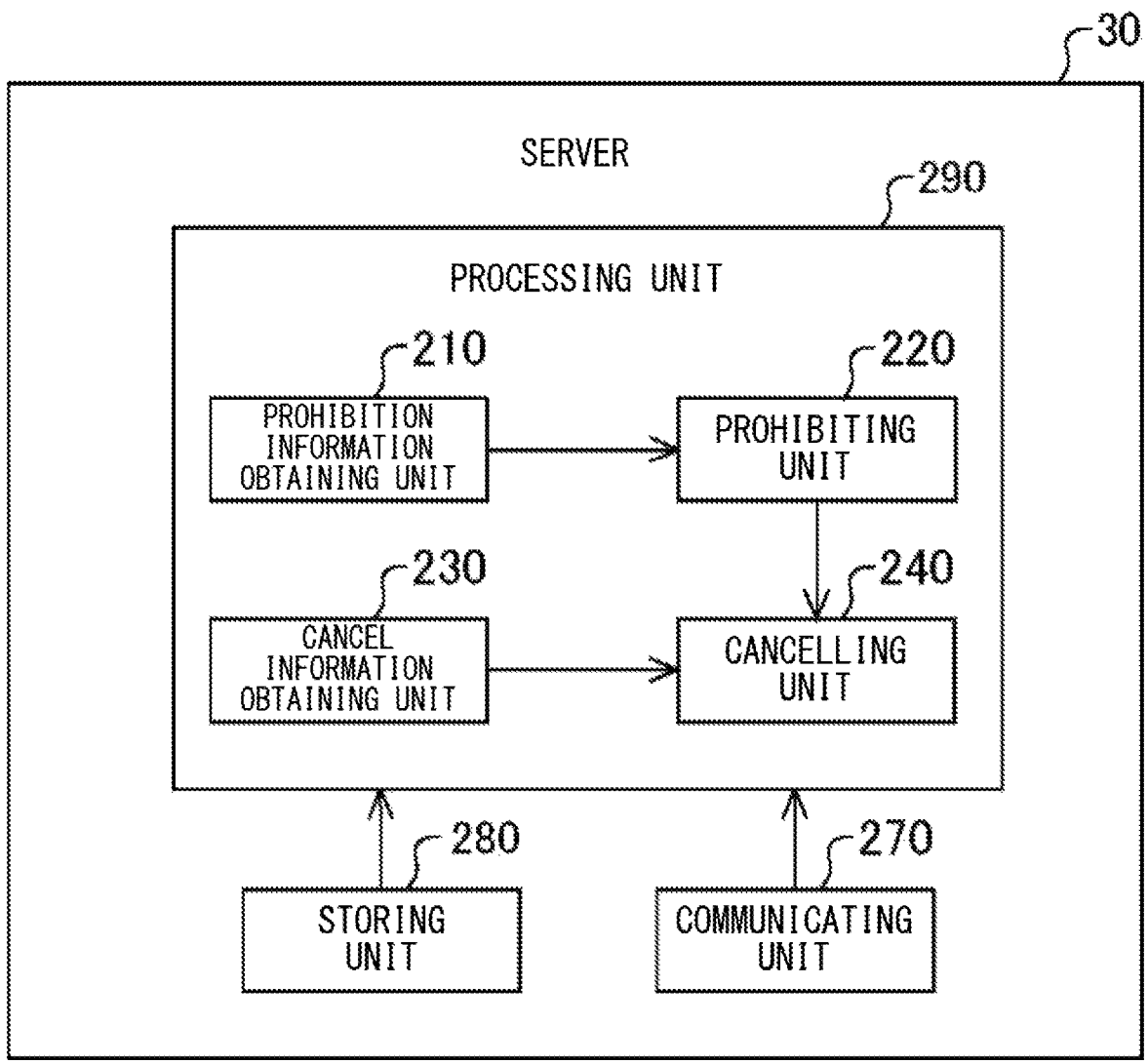
FIG. 2 schematically shows a functional configuration of a server 30.

FIG. 2 schematically shows a functional configuration of a server 30. The server 30 includes a processing unit 290, a storing unit 280, and a communicating unit 270. The processing unit 290 has a prohibition information obtaining unit 210, a prohibiting unit 220, a cancel information obtaining unit 230, and a cancelling unit 240.

The server 30 is a kind of computer. For example, the processing unit 290 is a processing device such as a microprocessor. The communicating unit 270 is configured to communicate with the user terminal 70 and the terminal of the designated driver service company 50 via the network 90. The storing unit 280 is configured to store information necessary for operations of the server 30. For example, the storing unit 280 stores control programs for the processing unit 290 and the communicating unit 270, constants and variables used by the control programs, and temporary information necessary for computing the control programs. The storing unit 280 is one example of a computer-readable storage medium.

The prohibition information obtaining unit 210 is configured to obtain starting prohibition information including first user identification information and vehicle identification information. When a first user identified by the first user identification information included in the starting prohibition information is a user who is permitted to prohibit starting of a vehicle, the prohibiting unit 220 is configured to prohibit starting of the vehicle identified by the vehicle identification information included in the starting prohibition information. Note that starting means starting to put a vehicle in motion. The starting is not limited to starting of an engine or a motor. Prohibition of starting means prohibiting putting a vehicle in motion in order, for example, to prevent the vehicle from being driven.

In the present embodiment, the user 80 is one example of the first user. The vehicle identification information is, for example, the vehicle registration number of the vehicle 40. If the vehicle 40 is a mini-vehicle or the like, the vehicle identification information may be a vehicle number. If the vehicle 40 is a small-sized special motor vehicle, a motorized two-wheeled vehicle, or the like, the vehicle identification information may be the number displayed in a tag attached to the vehicle. The prohibiting unit 220 prohibits the vehicle 40 from starting by causing the communicating unit 270 to, send to the vehicle 40, a starting prohibition signal that instructs prohibition of starting.

The cancel information obtaining unit 230 is configured to obtain the prohibition cancel information including second user identification information and vehicle identification information. When a second user identified by the second user identification information included in the prohibition cancel information is a user who is permitted to cancel prohibition of starting of a vehicle and a vehicle identified by the vehicle identification information included in the prohibition cancel information is the vehicle which has been prohibited by the prohibiting unit 220 from starting, the cancelling unit 240 cancels the prohibition of the starting of the vehicle identified by the vehicle identification information included in the prohibition cancel information.

When a predetermined amount of time elapses after the prohibiting unit 220 prohibits the vehicle from starting, the cancelling unit 240 may cancel the prohibition of the starting of the vehicle by the prohibiting unit 220 regardless of whether or not the cancel information obtaining unit 230 has obtained the prohibition cancel information. In this way, the prohibition of the starting of the vehicle 40 is cancelled after needed period of time elapses even if, for example, the user 80 does not utilize designated driver service. Therefore, the user 80 is allowed to drive the vehicle 40 after the needed amount of time elapses even if the user 80 does not utilize designated driver service as a result of spending a night at the place of the companion 82, etc.

The storing unit 280 is configured to store one or more pieces of user identification information about one or more users who are permitted to prohibit a vehicle from starting. When the first user identification information included in starting prohibition information is stored in the storing unit 280, the prohibiting unit 220 prohibits starting of a vehicle identified by the vehicle identification information included in the starting prohibition information.

To be specific, the storing unit 280 stores pieces of vehicle identification information in association with pieces of user identification information, where the pieces of user identification information are about a plurality of users who are permitted to prohibit a vehicle from starting, and each piece of vehicle identification information is about a vehicle a corresponding one of the users is allowed to prohibit from starting. When the storing unit 280 stores the vehicle identification information included in the starting prohibition information in association with the first user identification information included in the starting prohibition information, the prohibiting unit 220 prohibits a vehicle from starting, where the vehicle is identified by the vehicle identification information included in the starting prohibition information. For example, the storing unit 280 stores pieces of vehicle identification information in association with pieces of user identification information, where the pieces of user identification information are about a plurality of users, and each piece of vehicle identification information is about a vehicle a corresponding one of the users owns and is allowed to prohibit from starting. In this way, the chance can be reduced of starting of a vehicle being prohibited without asking by one who does not have permission to prohibit starting.

The storing unit 280 is configured to store one or more pieces of user identification information about one or more users who are permitted to cancel prohibition of starting of a vehicle. When the second user identification information included in prohibition cancel information is stored in the storing unit 280, the cancelling unit 240 cancels the prohibition of the starting of the vehicle identified by the vehicle identification information included in the prohibition cancel information. In this way, the chance can be reduced of starting prohibition state of the vehicle being cancelled without asking by one who does not have permission to cancel starting prohibition.

In the present embodiment, the designated driver service company or the designated driver 60 thereof is one example of the second user. The storing unit 280 may store information identifying one or more designated driver service companies which are permitted to cancel prohibition of starting of a vehicle. In this way, the designated driver service companies registered with the drunk driving prevention system 10 can be permitted to cancel starting prohibition. Note that the storing unit 280 is one example of a prohibition-permitted user information storing unit and a cancel permittee information storing unit.

FIG. 3 shows prohibition-permitted user information in a table. The prohibition-permitted user information associates a user ID of a user who may prohibit starting with a vehicle ID of a vehicle of which starting may be prohibited by the user.

As shown in FIG. 3, the storing unit 280 stores one or more vehicle IDs in association with a plurality of respective user IDs. The user ID is one example of user identification information about a user who has permission to prohibit a vehicle from starting in the drunk driving prevention system 10. The user ID is, for example, the driver's license number of the user 80 or unique information derived from home address or the like of the user 80. The vehicle ID is, for example, a vehicle registration number.

For example, when the user 80 purchases the vehicle 40 at an automobile dealership, if the user 80 wishes to be allowed to prohibit the vehicle 40 from starting by his or herself, the vehicle registration number of the vehicle 40, the identification information about the user 80 and the vehicle ID of the vehicle 40 are provided from a terminal of the dealership to the server 30 for storage in the storing unit 280. The identification information about the user 80 is registered with the drunk driving prevention application software on the user terminal 70.

Note that the storing unit 280 stores, as cancel permittee information, pieces of identification information which the operator of the drunk driving prevention system 10 assigns separately to respective designated driver service companies which are permitted to cancel starting prohibition. The identification information about the designated driver service company included in the cancel permittee information is registered with the drunk driving prevention application software on the terminal of the designated driver service company 50 of the designated driver 60 of each of the designated driver service companies.

Figure 4:
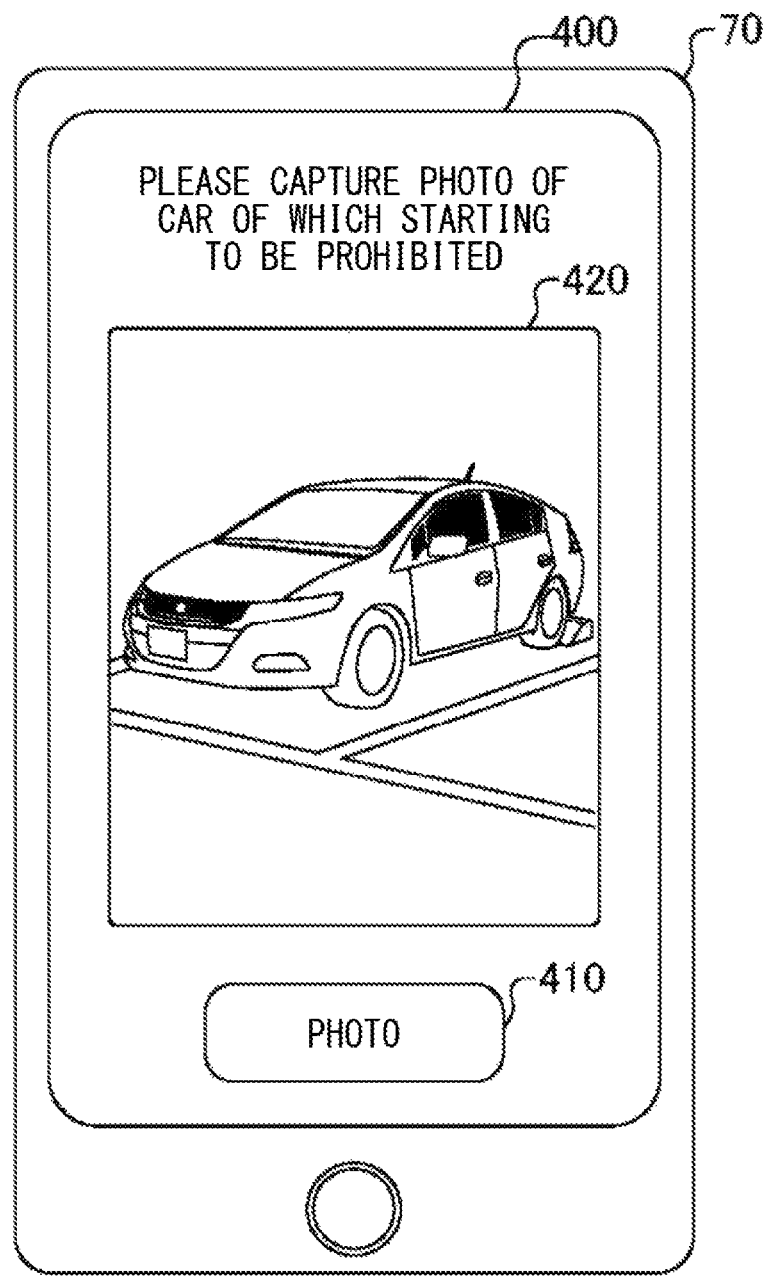
FIG. 4 shows one example of a screen image displayed on the screen of a user terminal 70 when starting of a vehicle 40 is prohibited.

FIG. 4 shows one example of a screen image displayed on a user terminal 70 when starting of the vehicle 40 is prohibited. When the user 80 launches the drunk driving prevention application software on the user terminal 70, a screen image 400 is displayed on the user terminal 70. The screen image 400 includes an object 410 representing a shutter button and an object 420 representing an image captured continuously with an image-capturing function of the user terminal 70.

When the user 80 touches the object 410, the user terminal 70 locates an area of the license plate in the image captured with the image-capturing function to extract the vehicle registration number of the vehicle 40 from the located area. The vehicle registration number read by the user terminal 70 is sent to the server 30 together with the user ID stored in the user terminal 70 as starting prohibition information.

Note that if any vehicle registration number cannot be extracted, the user terminal 70 may prompt the user 80 to input a vehicle registration number, and send the input vehicle registration number to the server 30. Alternatively, the user terminal 70 may store vehicle registration numbers of vehicles of which starting may be prohibited by the user 80, and extract the vehicle registration number that matches the most with the number read from the image in the stored vehicle registration numbers. Instead, the user terminal 70 may store feature quantities such as colors and shapes of vehicles and the vehicle registration numbers in an associated manner, and extract the vehicle registration number stored in association with the feature quantity that matches the most with the feature extracted from the captured image.

In the server 30, when determining that the user 80 may prohibit the vehicle 40 from starting based on the starting prohibition information received from the user terminal 70 and the user ID and the vehicle ID stored in the storing unit 280, the prohibiting unit 220 sends a starting prohibition signal to the vehicle 40. When receiving from the starting prohibition controller 42 of the vehicle 40 a prohibition completion signal indicating that prohibition of the starting is completed, the prohibiting unit 220 sends, to the user terminal 70, prohibition period information indicating a period of time during which the starting is prohibited. The user terminal 70 stores the prohibition period information with the captured image of the vehicle 40.

Figure 5:
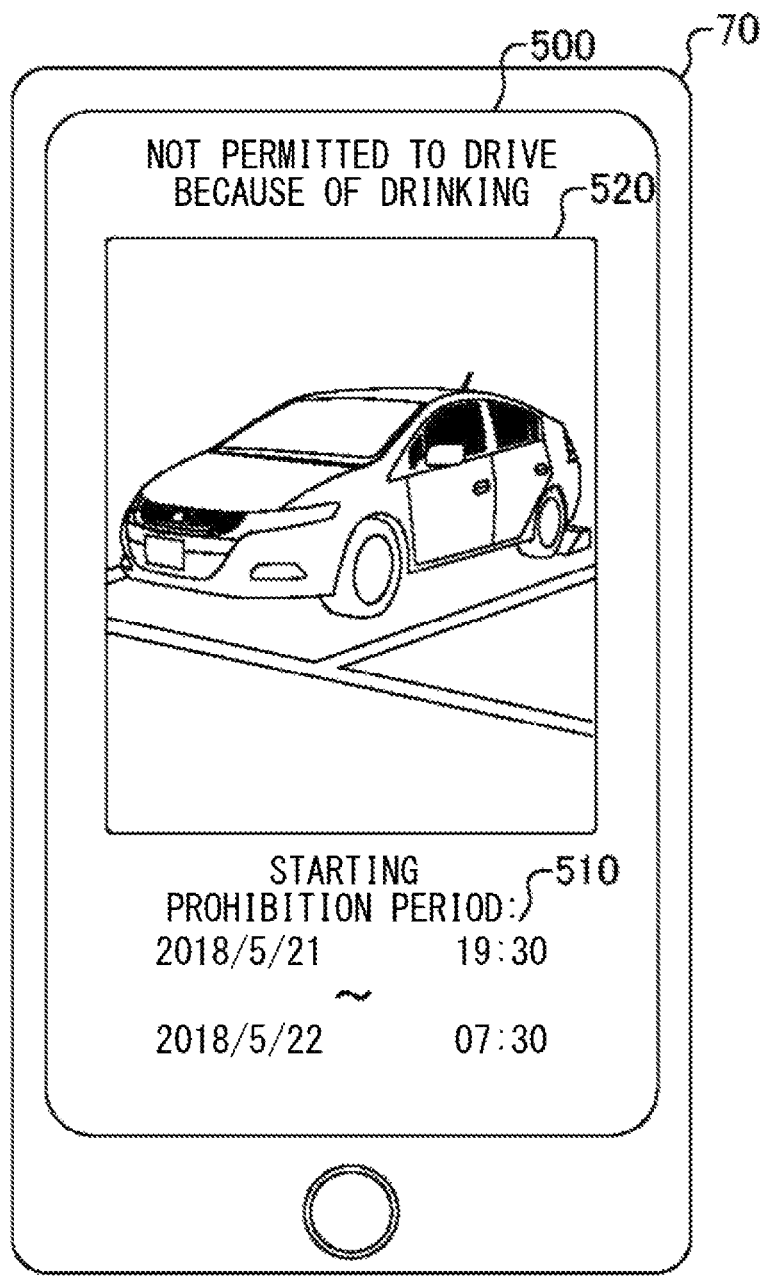
FIG. 5 schematically shows one example of a screen image presented to staff of an eating establishment 20.

FIG. 5 schematically shows one example of the screen image presented to staff of the eating establishment 20. When instructed by the user 80 to display the starting prohibition state through the drunk driving prevention application software, the user terminal 70 displays a screen image 500 shown in FIG. 5. The screen image 500 includes an object 510 indicating the starting prohibition period which is based on the prohibition period information stored on the user terminal 70 and an image object 520 of the vehicle 40 stored on the user terminal 70. The staff of the eating establishment 20 can confirm by the screen image 500 that the vehicle 40 is in a driving-prohibited state. The eating establishment 20 then offers service such as discount to the user 80 and the companion 82.

FIG. 6 schematically shows in a table, one example of prohibition management information managed by the server 30. The prohibition management information is stored in the storing unit 280. The prohibition management information is information in which a user ID, a vehicle ID, a prohibition time, a scheduled cancel time, a cancel time and a designated driver service company ID are associated with one another. Each of the user ID and the vehicle ID is information included in the starting prohibition information. The prohibition time is a time of prohibiting starting of the vehicle 40.

The scheduled cancel time is a scheduled time of cancelling starting prohibition. The scheduled cancel time may be a time a predetermined amount of time after the prohibition time. The predetermined amount of time may be around 12 hours. The scheduled cancel time, which is designated by the user 80 on the user terminal 70, may be included in the starting prohibition information and sent to the server 30. The cancel time is an actual time of cancelling the starting prohibition. For example, the cancel time is a time of cancelling the prohibition of the starting of the vehicle 40 based on the prohibition cancel information from the terminal of the designated driver service company 50. The designated driver service company ID is one example of identification information about the designated driver service company included in the prohibition cancel information from the user terminal 70.

Figure 7:
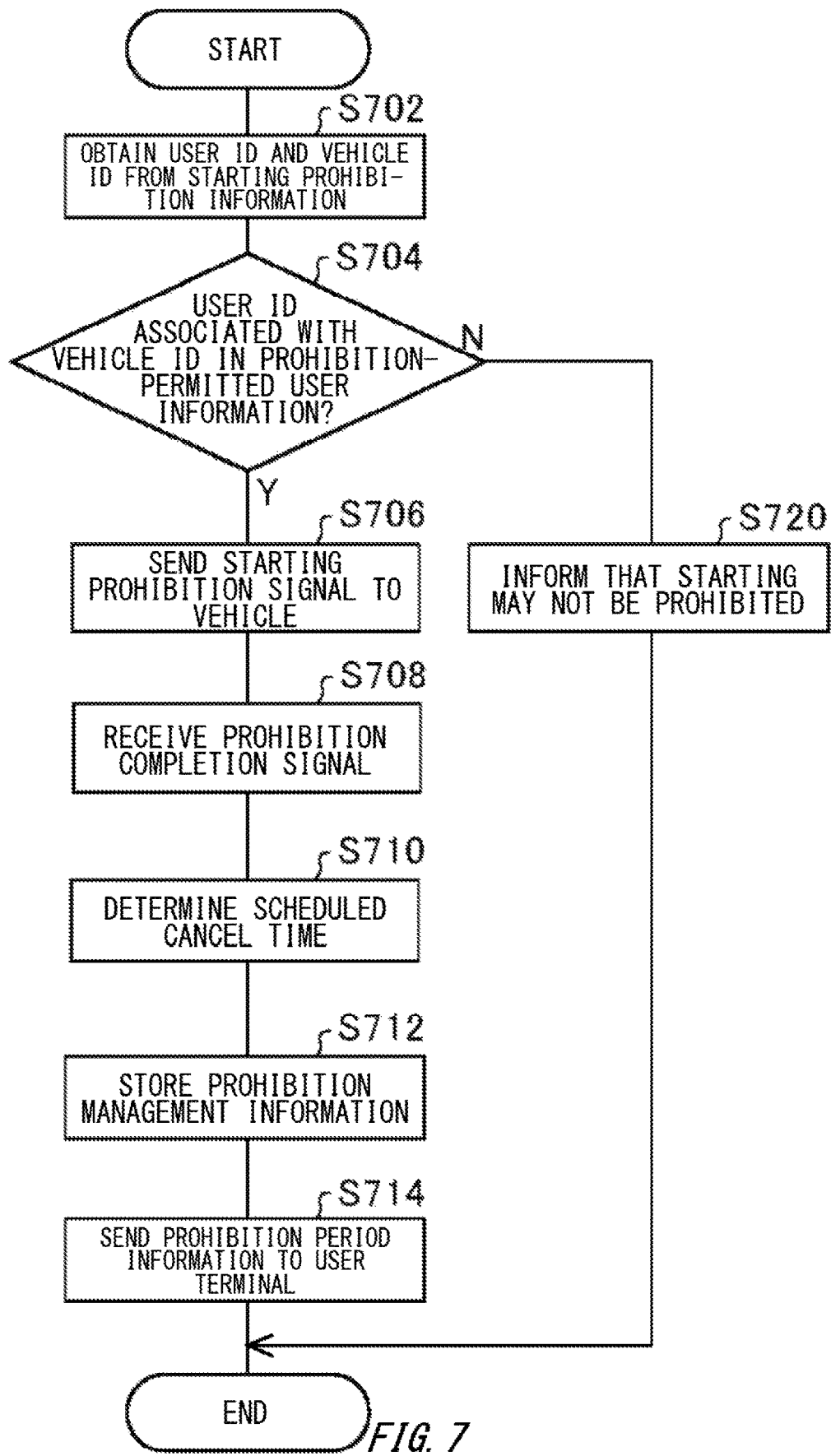
FIG. 7 is a flowchart of starting prohibition processing performed by the server 30 on the vehicle 40.

FIG. 7 is a flowchart of starting prohibition processing performed by the server 30 on the vehicle 40. Processing of this flowchart is initiated when starting prohibition information is included in data received by the communicating unit 270.

At S702, the prohibition information obtaining unit 210 obtains a user ID and a vehicle ID from the starting prohibition information. At S704, in reference to prohibition-permitted user information stored in the storing unit 280, the prohibiting unit 220 determines whether the user ID and the vehicle ID obtained from the starting prohibition information are associated with each other in the prohibition-permitted user information.

When the user ID and the vehicle ID obtained from the starting prohibition information are associated with each other, the prohibiting unit 220 sends, at S706, a starting prohibition signal to the vehicle 40 identified by the vehicle ID. When receiving the prohibition completion signal from the vehicle 40 at S708, the prohibiting unit 220 determines a scheduled cancel time at S710. Next, at S712, the storing unit 280 stores prohibition management information as shown in FIG. 6, etc. At S714, the prohibiting unit 220 sends prohibition period information to the user terminal 70 via the communicating unit 270, and then the processing of this flowchart ends. Note that if the user ID and the vehicle ID obtained from the starting prohibition information are not associated with each other in the prohibition-permitted user information at S704, indication that starting may not be prohibited is sent to the user terminal 70 at S720, and then the processing of this flowchart ends.

Figure 8:
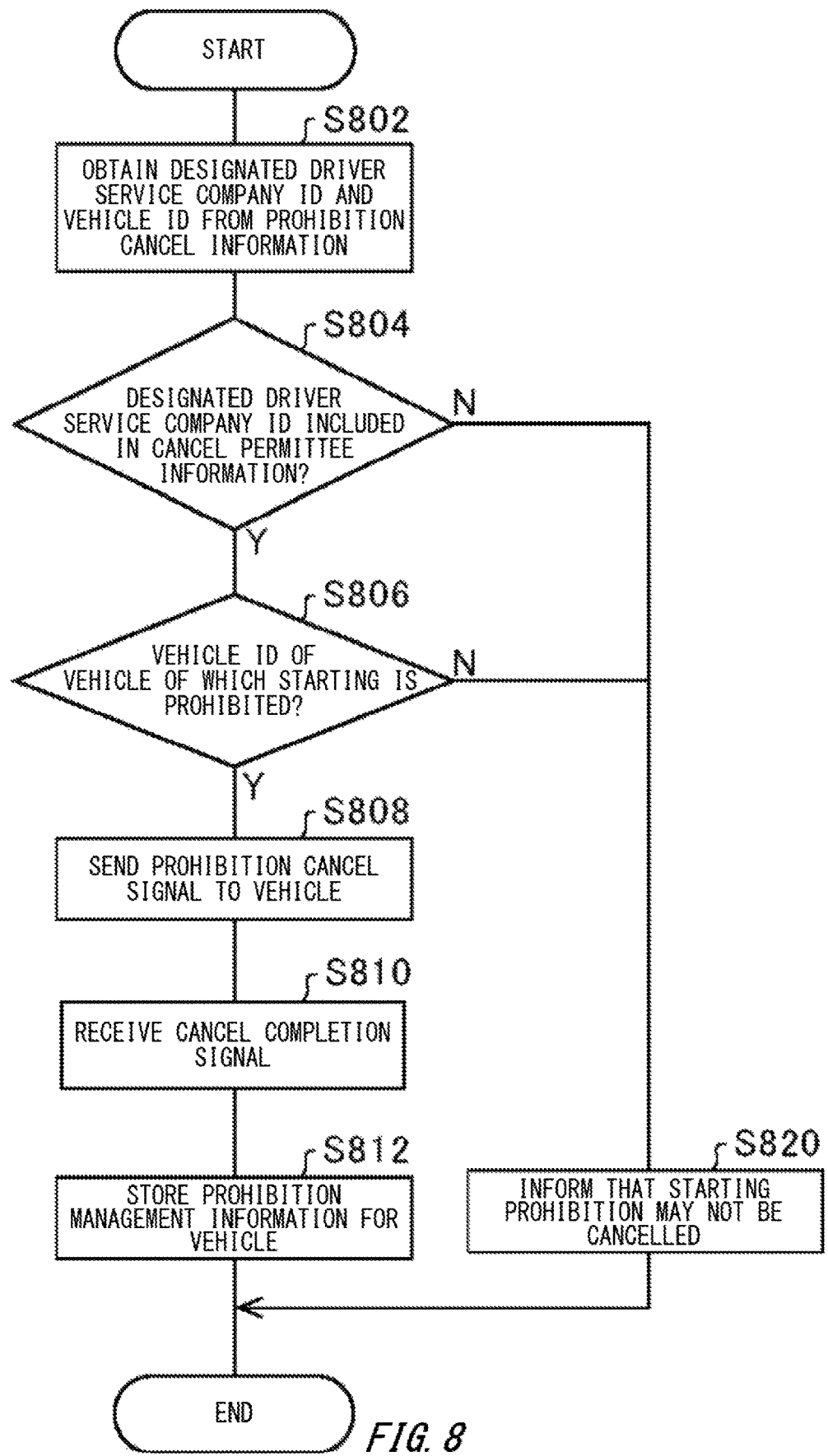
FIG. 8 is a flowchart of starting prohibition cancel processing performed by the server 30.

FIG. 8 is a flowchart of starting prohibition cancel processing performed by the server 30. Processing of this flowchart is initiated when prohibition cancel information is included in data received by the communicating unit 270.

At S802, the cancel information obtaining unit 230 obtains a designated driver service company ID and a vehicle ID from the prohibition cancel information. At S804, in reference to cancel permittee information stored in the storing unit 280, the cancelling unit 240 determines whether the designated driver service company ID obtained from the prohibition cancel information is included in the cancel permittee information. When the designated driver service company ID obtained is included in the cancel permittee information, the cancelling unit 240 determines at S806 whether the vehicle ID obtained from the prohibition cancel information is the vehicle ID of the vehicle of which starting is currently prohibited in reference to the prohibition management information. When the obtain vehicle ID is the vehicle ID of the vehicle of which starting is currently prohibited, the cancelling unit 240 sends a prohibition cancel signal to the vehicle 40 at S808.

When receiving a cancel completion signal from the vehicle 40 at S810, the storing unit 280 stores at S812 the reception time of the cancel completion signal and the designated driver service company ID obtained at S802 in the prohibition management information, and then the processing of this flowchart ends. Note that if at S804, the designated driver service company ID is not included in the cancel permittee information, or if at S806, the vehicle ID obtained at S802 is not the vehicle ID of the vehicle of which starting is currently prohibited, the indication that starting prohibition may not be cancelled is sent to the terminal of the designated driver service company 50 at S820, and then the processing of this flowchart ends.

As described above, with the drunk driving prevention system 10, once the user 80 prohibits the vehicle 40 from starting, the vehicle 40 does not enter an driving-allowed state before a predetermined amount of time elapses, unless a third person cancels the prohibition of the starting of the vehicle 40. Therefore, a mechanism can be introduced that prohibits the user 80 from readily driving a vehicle though relying on the will of the user 80.

Note that, in the present embodiment, the user 80 is the owner of the vehicle 40. However, the drunk driving prevention system 10 can be applied not only to a mode intended for the vehicle 40 of a private owner, but also to a car rental system, a sharing system, or the like. As such, the drunk driving prevention system 10 can be applied to a mode in which the operator or the like of the drunk driving prevention system 10 is an owner or a manager of the vehicle 40.

Figure 9:
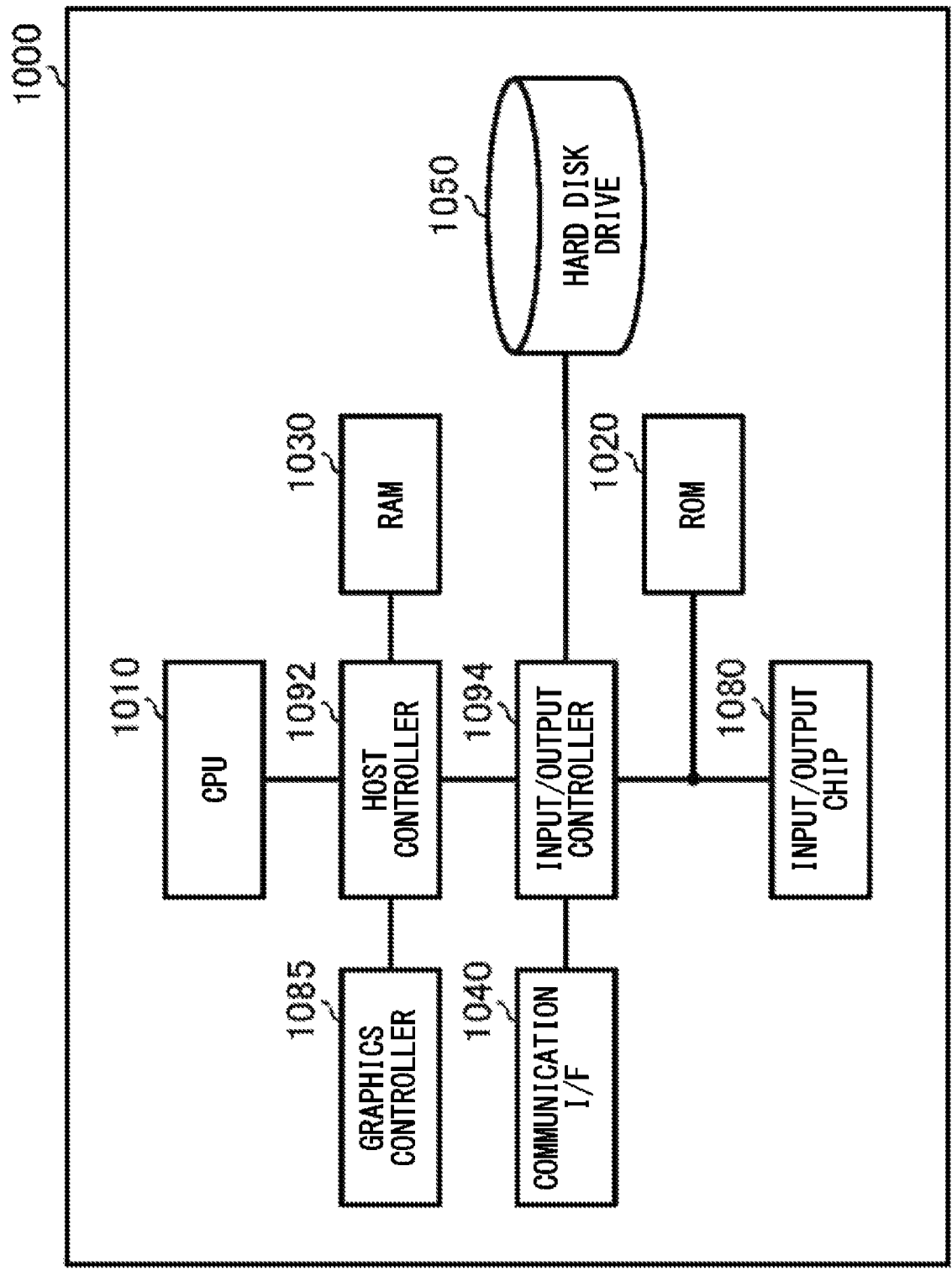
FIG. 9 schematically shows one example of a computer 1000 serving as a server 30.

FIG. 9 schematically shows one example of a computer 1000 serving as a server 30. The computer 1000 in the present embodiment includes a CPU surrounding part having a CPU 1010, a RAM 1030, and a graphics controller 1085 which are connected to one another via a host controller 1092 and an input/output part having a ROM 1020, a communication I/F 1040, a hard disk drive 1050, and an input/output chip 1080 which are connected to the host controller 1092 via a input/output controller 1094.

The CPU 1010 is configured to operate based on programs stored in the ROM 1020 and the RAM 1030 to control each part. The graphics controller 1085 is configured to obtain and render on a display image data generated by the CPU 1010 or the like on a frame buffer provided in the RAM 1030. Alternatively, the graphics controller 1085 may include therein the frame buffer for storing the image data generated by the CPU 1010 or the like.

The communication I/F 1040 is configured to communicate with other devices by wire or wirelessly over a network. The communication I/F 1040 also serves as a communication hardware. The hard disk drive 1050 is configured to store programs and data used by the CPU 1010.

The ROM 1020 is configured to store boot programs executed by the computer 1000 at bootup, programs dependent on hardware in the computer 1000, and the like. The input/output chip 1080 is configured to connect various kinds of input/output devices to the input/output controller 1094 via, for example, a parallel port, a serial port, a keyboard port, mouse port, etc.

Programs to be provided to the hard disk drive 1050 via the RAM 1030 are stored in a recording medium such as an IC card for provision by a user. The programs are read from the recording medium, installed on the hard disk drive 1050 via the RAM 1030, and executed on the CPU 1010.

Similarly, programs installed on the computer 1000 and for causing the computer 1000 to serve as the server 30 may act on the CPU 1010 or the like to cause the computer 1000 to serve as the respective units in the server 30 including the prohibition information obtaining unit 210, the prohibiting unit 220, the cancel information obtaining unit 230, the cancelling unit 240, the storing unit 280, and the communicating unit 270. Information processing described in these programs are read into the computer 1000 to cause the computer to serve as a specific means realized by cooperation of software and the various kinds of hardware resources described above. With the specific means, the server 30 is specifically built up according to intended use by achieving computation or processing of information to suit the intended use of the computer 1000 in the present embodiment.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10. drunk driving prevention system,
20. eating establishment,
30. server,
40. vehicle,
42. starting prohibition controller,
50. terminal of the designated driver service company,
60, 62. designated driver,
68. associated car,
70. user terminal,
80. user,
82. companion,
90. network,
210. prohibition information obtaining unit,
220. prohibiting unit,
230. cancel information obtaining unit,
240. cancelling unit,
270. communicating unit,
280. storing unit,
290. processing unit,
400. screen image,
410, 420. Object,
500. screen image,
510, 520. Object,
1000. computer,
1010. CPU,
1020. ROM,
1030. RAM,
1040. communication I/F,
1050. hard disk drive,
1080. input/output chip,
1085. graphics controller,
1092. host controller,
1094. input/output controller

What is claimed is:

1. A system, comprising:
a prohibition information obtaining unit configured to obtain starting prohibition information including first user identification information and vehicle identification information;
a prohibiting unit configured to, when a first user identified by the first user identification information included in the starting prohibition information is a user who is permitted to prohibit a vehicle from starting, prohibit a vehicle from starting, the vehicle being identified by the vehicle identification information included in the starting prohibition information;
a cancel information obtaining unit configured to obtain prohibition cancel information including second user identification information and vehicle identification information; and
a cancelling unit configured to, when a second user identified by the second user identification information included in the prohibition cancel information is a user who is permitted to cancel prohibition of starting of a vehicle and a vehicle identified by the vehicle identification information included in the prohibition cancel information is the vehicle which has been prohibited by the prohibiting unit from starting, cancel the prohibition of the starting of the vehicle identified by the vehicle identification information included in the prohibition cancel information.

2. The system according to claim 1,
wherein when a predetermined amount of time elapses after the prohibiting unit prohibits the vehicle from starting, the cancelling unit cancels the prohibition of the starting of the vehicle by the prohibiting unit regardless of whether or not the prohibition cancel information has been obtained.

3. The system according to claim 1, further comprising a prohibition-permitted user information storing unit configured to store one or more pieces of user identification information about one or more users who are permitted to prohibit a vehicle from starting,
wherein when the first user identification information included in the starting prohibition information is stored in the prohibition-permitted user information storing unit, the prohibiting unit prohibits a vehicle from starting, the vehicle being identified by the vehicle identification information included in the starting prohibition information.

4. The system according to claim 3,
wherein the prohibition-permitted user information storing unit stores pieces of vehicle identification information in association with pieces of user identification information, the pieces of user identification information are about a plurality of users who are permitted to prohibit a vehicle from starting, and each piece of vehicle identification information is about a vehicle a corresponding one of the users is allowed to prohibit from starting, and
when the prohibition-permitted user information storing unit stores the vehicle identification information included in the starting prohibition information in association with the first user identification information included in the starting prohibition information, the prohibiting unit prohibits a vehicle from starting, the vehicle being identified by the vehicle identification information included in the starting prohibition information.

5. The system according to claim 4,
wherein the prohibition-permitted user information storing unit stores pieces of vehicle identification information in association with pieces of user identification information, the pieces of user identification information are about a plurality of users, and each piece of vehicle identification information is about a vehicle a corresponding one of the users owns and is allowed to prohibit from starting.

6. The system according to claim 1, further comprising
a cancel permittee information storing unit configured to store one or more pieces of user identification information about one or more users who are permitted to cancel prohibition of starting of a vehicle,
wherein when the second user identification information included in the prohibition cancel information is stored in the cancel permittee information storing unit, the cancelling unit cancels the prohibition of the starting of the vehicle identified by the vehicle identification information included in the prohibition cancel information.

7. The system according to claim 6, wherein the cancel permittee information storing unit stores one or more pieces of information identifying one or more designated driver service companies which are permitted to cancel prohibition of starting of a vehicle.

8. The system according to claim 2,
wherein the prohibiting unit sends, to a user terminal of the first user, information indicating a period of time during which the starting of the vehicle is prohibited.

9. The system according to claim 2,
wherein the prohibiting unit prohibits the vehicle from starting by sending a starting prohibition signal to the vehicle, and
when the predetermined amount of time elapses after the prohibiting unit prohibits the vehicle from starting, the cancelling unit cancels the prohibition of the starting of the vehicle by the prohibiting unit by sending to the vehicle a prohibition cancel signal that instructs cancel of the prohibition of the starting of the vehicle.

10. The system according to claim 1, further comprising the vehicle.

11. A non-transitory computer readable storage medium storing a program for causing a computer to serve as:
a prohibition information obtaining unit configured to obtain starting prohibition information including first user identification information and vehicle identification information;
a prohibiting unit configured to, when a first user identified by the first user identification information included in the starting prohibition information is a user who is permitted to prohibit a vehicle from starting, prohibit a vehicle from starting, the vehicle being identified by the vehicle identification information included in the starting prohibition information;
a cancel information obtaining unit configured to obtain prohibition cancel information including second user identification information and vehicle identification information; and
a cancelling unit configured to, when a second user identified by the second user identification information included in the prohibition cancel information is a user who is permitted to cancel prohibition of starting of a vehicle and a vehicle identified by the vehicle identification information included in the prohibition cancel information is the vehicle which has been prohibited by the prohibiting unit from starting, cancel the prohibition of the starting of the vehicle identified by the vehicle identification information included in the prohibition cancel information.

* * * * *